US005198166A

United States Patent [19]

Bordelon

[11] Patent Number: 5,198,166

[45] Date of Patent: Mar. 30, 1993

[54] METHOD OF CONSTRUCTING JEWELRY ARTICLES OF COTTON THREAD FRAGMENTS

[76] Inventor: Trudie Bordelon, 3529 Pasadena Dr., Baton Rouge, La. 70814

[21] Appl. No.: 886,650

[22] Filed: May 20, 1992

[51] Int. Cl.[5] ............................................ B29C 67/00

[52] U.S. Cl. ................................ 264/73; 63/DIG. 3; 264/115; 264/DIG. 55

[58] Field of Search ................ 264/73, 115, DIG. 55; 63/DIG. 3, 2, 12

[56] References Cited

U.S. PATENT DOCUMENTS 4,159,301 6/1979 Buser et al. .......................... 264/73
4,248,816 2/1981 Sheridan .............................. 264/73
4,923,657 5/1990 Gembinski et al. .................. 264/73

*Primary Examiner*—Mary Lynn Theisen
*Attorney, Agent, or Firm*—Pravel, Gambrell, Hewitt, Kimball & Krieger

[57] ABSTRACT

A method of forming jewelry articles discloses a method of constructing multi-colored jewelry from multiple colored thread parts which are cut into short threads of approximately one-half inch in length. The cut threads of different colors are then mixed in combination with a liquid glue product and a fabric stiffener. The mixture is blended and formed into a desired shape using a mold cavity. The blend produces a "marbled look" and the mold is polished so as to give the finished article a glossy, marbled look resembling certain stone such as granite.

12 Claims, 2 Drawing Sheets

METHOD OF CONSTRUCTING JEWELRY ARTICLES OF COTTON THREAD FRAGMENTS

BACKGROUND OF THE INVENTION

1. Field Of The Invention

The present invention relates to a method of constructing jewelry articles and more particularly relates to a method of constructing multicolored jewelry articles from various colored textile parts wherein the textile parts are separated into short threads (e.g. one half (½") inch in length) and then mixed with a combination of a liquid glue product and a fabric stiffener. The mixture is blended until a "marbled" look is achieved. This mixture can then be formed into desired shapes using mold cavities. The desired shapes are allowed to dry until the molded article is hard, and can function as a jewelry article such as a pin or earrings. More particularly, the present invention relates to a improved method of constructing jewelry articles using denim fabric which is shredded into separate threads of blue and white color, mixed with glue and fabric stiffener and a ratio of one quarter (¼) liquid to thread which produces a marbled hard end product for use as earrings, pins, pendants and the like.

2. General Background

Jewelry articles are frequently molded of a paper, strings, or fabric products in combination with a water based glue, commonly referred to as paper mache. Such articles are known to be formed in any number of desired shapes as selected by the user. The present invention provides an improved method that produces a "marbled" article that is hard and shiny, simulating stone, but with little weight to burden the user.

SUMMARY OF THE PRESENT INVENTION

The present invention provides an improved method of forming jewelry articles which produces a uniquely marbled and shiny appearance to a jewelry article that is formed of fabric or thread material. The method includes the providing of a fabric portion which can then be separated into individual threads wherein the fabric portion is a denim fabric having multiple thread colors such as blue and white or blue and grey. The denim fabric portion is separated into the individual thread colors and the threads are cut into a short length such as for example one-half inch. A liquid portion is prepared that includes a combination of liquid glue and a fabric stiffener.

The chopped threads, glue and fabric stiffener are combined in a container.

The threads, glue and fabric stiffener are mixed in the container until blended so that blending provides a marbled look to the mixture. The blended threads, glue and fabric stiffener are then placed into a selected cavity of a mold such as circular, triangular, rectangular or the like. The molded article is then allowed to dry.

In the preferred method, the fabric is a denim and preferably a cotton material.

The glue and fabric stiffener are preferably mixed in equal portions.

The volume of chopped threads is greater than the volume of liquid, preferably three times as great.

The threads are preferably of a different color including a first thread portion of a lighter color and a second thread portion of a darker color.

In the preferred method, each of the threads is cut into short pieces, each less than one inch in length and wherein a one half inch length is preferable.

The fabric stiffener is preferably water-based. The glue is preferably water-based.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
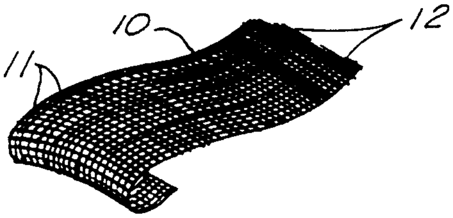
FIG. 1 is a perspective fragmentary view of a section of fabric used with the method of the present invention.
Figure 2:
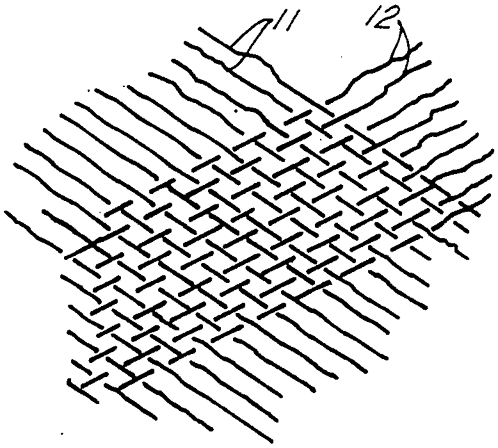
FIG. 2 is an enlarged view of a piece of fabric used with the method of the present invention and prior to separation of the fabric into individual threads.

In FIG. 1 there can be seen a portion of fabric 10 having a first plurality of parallel threads 11 and a second plurality of parallel threads 12 parallel to the first, the orientation of the threads being shown in more detail in FIG. 2.

Figure 3:
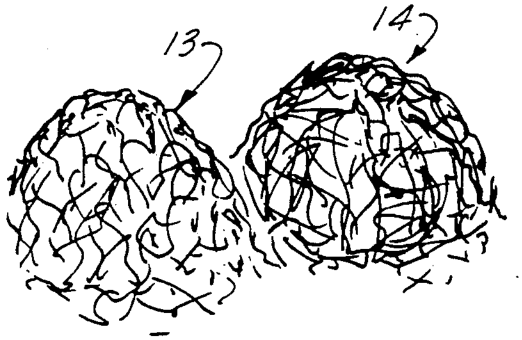
FIG. 3 is a perspective view illustrating schematically the separated threads of fabric in portions of separate colors.

The preferred fabric 10 is a denim fabric which is a mixture of threads 11 of a first color blue and threads 12 of a second color white (or grey). With the method of the present invention, the two portions of separately colored threads 11, 12 are unwoven and separated into two piles or portions as illustrated schematically in FIG. 3. For example, there can be a first portion 13 of blue threads and a second portion 14 of grey or white threads.

These two colored thread portions 13, 14 are preferably chopped into short pieces such as for example one half inch (½") in length. After the threads are chopped into a desired length, the threads 13, 14 are combined in a receptacle 15 and stirred (manually for example) using mixer 16.

Figure 4:
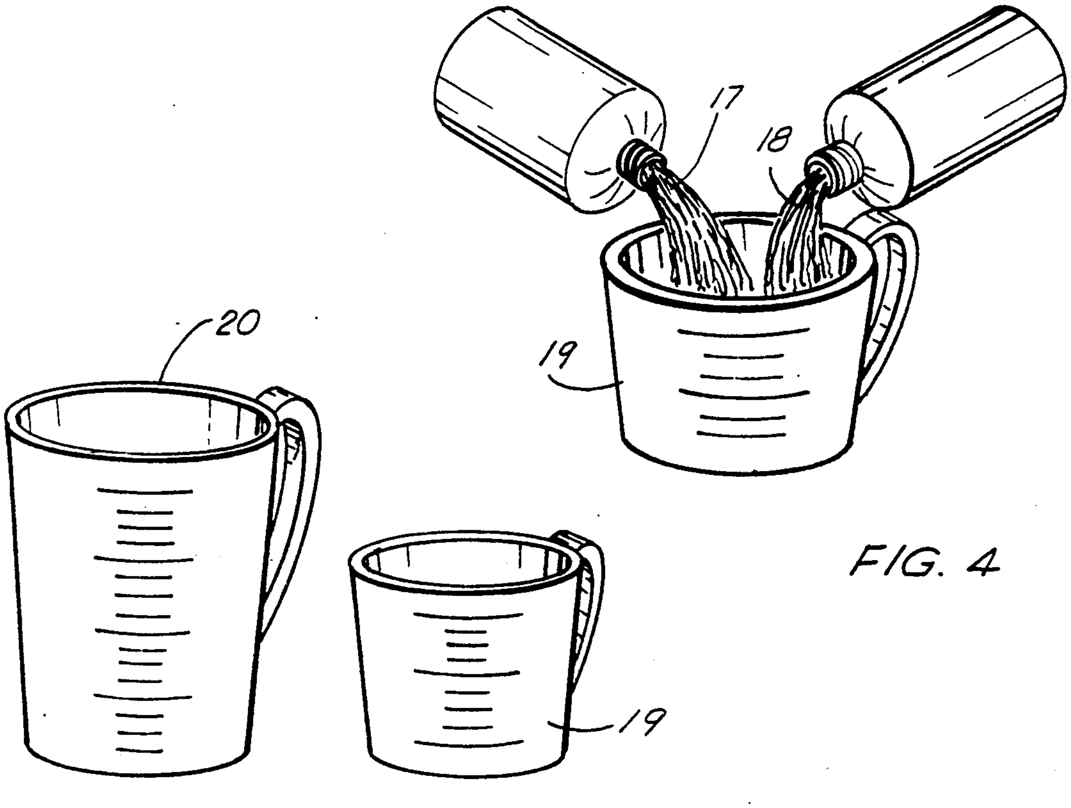
FIG. 4 is a perspective view illustrating the method of the present invention during the mixing step.

In vessel 16, the threads 13, 14 are combined with a liquid that consists of a combination of liquid glue 17 and a fabric stiffener 18. In the method of the present invention, the liquid glue 17 and liquid fabric stiffener 18 are combined in equal parts in a first vessel 19 as shown in FIG. 4.

A second vessel 20 contains the chopped thread portions 13, 14 and preferably in a larger volume than the volume of liquid 17, 18 contained in the vessel 19. In the preferred method, a first volume that includes fifty percent (50%) glue and fifty percent (50%) fabric softener is combined with a second volume of chopped threads. The second volume of threads is approximately triple the volume of the liquid glue/fabric mixture (e.g. 1 cup liquid and 3 cups thread).

Figure 5:
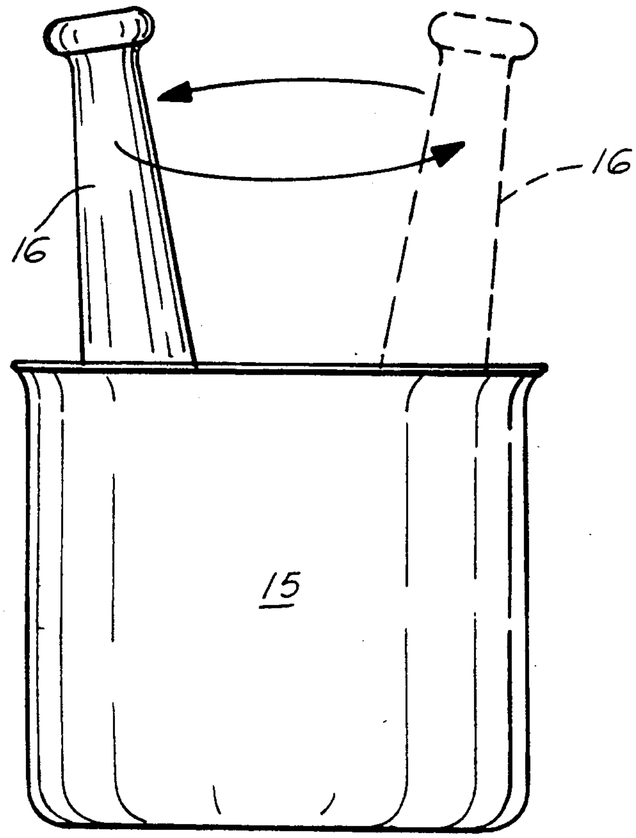
FIG. 5 is a schematic view illustrating the blending set of the method of the present invention.
Figure 6:
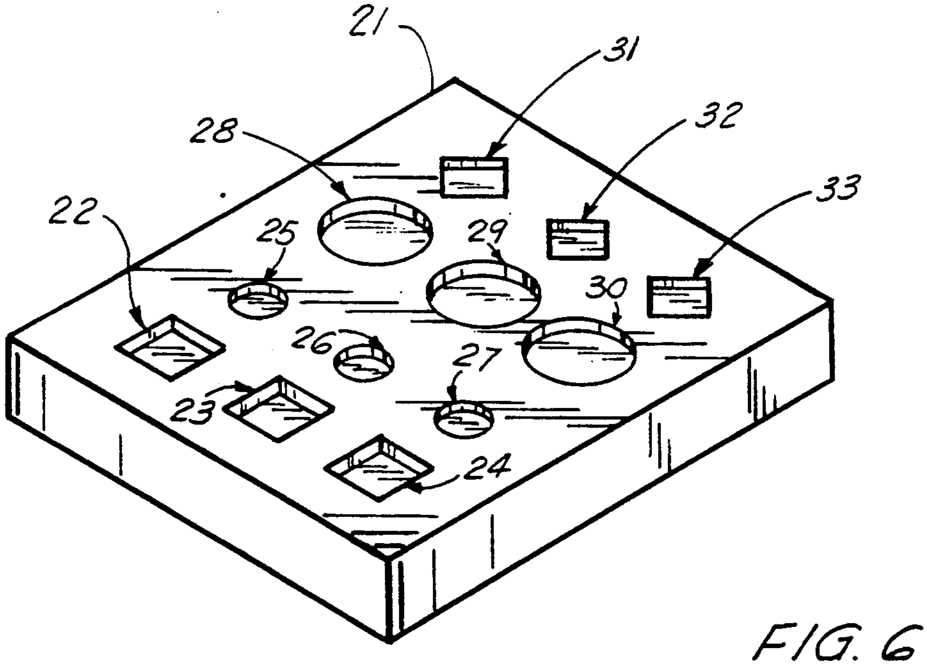
FIG. 6 is a perspective view of an example of a mold used with the method of the present invention.

In FIG. 5, receptacle 15 has received three parts of chopped threads 13, 14 and one part of liquid from vessel 19 (which includes 50% liquid glue 17 and 50% fabric stiffener 18). The mixture of chopped threads 13, 14 and liquid 17, 18 (glue and fabric stiffener) is blended well in the vessel 15. The mixture of chopped threads 13, 14 and liquid 17, 18 is wet and pliable after blending is completed in vessel 15. The mixture of chopped threads 13, 14 and liquid 17, 18 (glue and fabric stiffener) is poured from vessel 15 into a selected mold 21 which includes a plurality of cavities 22–33 as shown in FIG. 6. The cavities 22–33 include larger rectangular or square cavities 22–24, smaller circular cavities 25–27, larger circular cavities 28–30, and smaller, rectangular cavities 31–33. The combination of chopped threads 13, 14 and liquid 17, 18 is allowed to air dry after that mixture has been placed in a desired cavity 22–33 of mold 21. If desired, unused portions of the mixture of chopped threads 13, 14 and liquid 17, 18 can be stored in a sealed, airtight container for subsequent use.

The present invention provides an improved method of combining chopped, preferably cotton thread such as a denim fabric with a liquid glue and with fabric stiffener, the subsequent forming of that mixture into shapes which can be used to make jewelry. By using denim material, the chopped threads 13, 14 are of different colors such as blue and grey or blue and white. By blending the chopped threads of different color in the receptacle 15 (and prior to forming of the jewelry article such as 40) a very randomly stirred, "marbled" visual effect is achieved with the final jewelry article 40.

Figure 7:
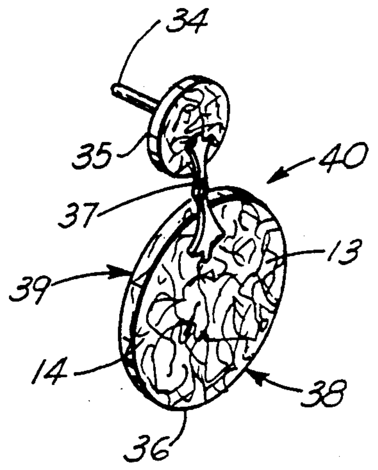
FIG. 7 is a perspective view illustrating an article jewelry as manufactured according to the method of the present invention.

Jewelry article 40 shown in FIG. 7 as an example represents an earring having a post portion 34, an upper smaller circular portion 35, a lower larger circular portion 36 and a link 37 which connects the upper 35 and lower 36 portions together. The link 37 can for example be in the form of a chain.

By using the aforedescribed combination of chopped portions of colored thread 13, 14 in combination with the liquid portion including liquid glue 17 and fabric stiffener 18, a hard yet shiny jewelry article 40 is formed which resembles a polished and marbled stone (such as granite) but without the attentive weight.

The liquid fabric stiffener 18 can be for example any commercially available fabric stiffener and draping liquid such as conforms to ASTM D-4236. Such a fabric stiffener is available from Aleene's, division of Artis, Inc. of Buellton, Calif.

A suitable glue product 17 is any commercially available all purpose water-based glue product such as is available from Aleene's, division of Artis, Inc., 85 Industrial Way, Buellton, Calif. 93427.

The following table 1 lists the part numbers and part descriptions as used herein and in the drawings attached hereto.

TABLE 1

| PART NO. | DESCRIPTION |
|---|---|
| 10 | fabric |
| 11 | thread |
| 12 | thread |
| 13 | chopped thread |
| 14 | chopped thread |
| 15 | vessel |
| 16 | mixer |
| 17 | glue |
| 18 | stiffener |
| 19 | receptacle |
| 20 | receptacle |
| 21 | mold |
| 22–24 | large square cavities |
| 25–27 | small round cavities |
| 28–30 | large round cavities |
| 31–33 | small square cavities |
| 34 | post |
| 35 | upper portion |
| 36 | lower portion |
| 37 | link |
| 38 | front surface |
| 39 | periphery |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of forming jewelry articles comprising the steps of:

a) providing a denim fabric portion having multiple thread colors;
b) separating the denim fabric portion into individual threads;
c) cutting the threads into a desired length;
d) preparing a liquid portion that includes a combination of a liquid glue and a fabric stiffener;
e) combining the chopped threads, glue, and fabric stiffener in a container;
f) mixing the threads, glue, and fabric stiffener in the container until blended;
g) forming the blended threads, glue, and fabric stiffener into a desired shape using a mold; and
h) allowing the formed molded article to dry.

2. The method of claim 1 wherein the fabric is cotton.

3. The method of claim 1 wherein the fabric has blue and white threads.

4. The method of claim 1 wherein the threads are of different colors including at least white as one color.

5. The method of claim 1 wherein substantially equal parts of glue and fabric stiffener comprise the liquid portion.

6. The method of claim 1 wherein the volume of chopped threads is greater than the volume of liquid portion.

7. The method of claim 1 wherein the threads are of a different color including a first thread portion of a lighter color and a second thread portion of a darker color.

8. The method of claim 1 wherein each of the threads is cut into a short piece less than one inch in length.

9. The method of claim 1 wherein the threads are cut into pieces of about one half (½") inch in length.

10. The method of claim 1 wherein the fabric stiffener is water-based.

11. The method of claim 1 wherein the glue is water-based.

12. A method of forming jewelry articles comprising the steps of:

a) providing a pair of thread portions including a first thread portion of a darker color and a second thread portion of a lighter color;
b) cutting the threads into a desired length;
c) preparing a liquid portion that includes a combination of a glue and a fabric stiffener;
d) combining the chopped threads, glue, and fabric stiffener in a container;
e) mixing the threads, glue and fabric stiffener in a container until blended; and
f) forming the blended threads, glue, and fabric stiffener into a desired shape using a mold and allowing the formed, molded article to dry.

* * * * *